US005714552A

United States Patent [19]

Bower

[11] Patent Number: 5,714,552
[45] Date of Patent: Feb. 3, 1998

[54] PROCESS FOR MAKING EPICHLOROHYDRIN RESINS

[75] Inventor: Barton K. Bower, Nottingham, Pa.

[73] Assignee: Hercules Incorporated, Wilmington, Del.

[21] Appl. No.: 217,084

[22] Filed: Mar. 24, 1994

Related U.S. Application Data

[63] Continuation of Ser. No. 939,858, Sep. 2, 1992, abandoned, which is a continuation of Ser. No. 819,560, Jan. 13, 1992, abandoned, which is a continuation-in-part of Ser. No. 619,835, Nov. 30, 1990, abandoned.

[51] Int. Cl.$^6$ .................. C08F 283/04; C08G 69/48
[52] U.S. Cl. .................. 525/420; 528/335; 528/336; 525/420; 525/433; 525/435; 525/540; 524/800; 524/845
[58] Field of Search .................. 528/335, 336; 525/420, 433, 435, 540; 524/800, 845

[56] References Cited

U.S. PATENT DOCUMENTS

| Re. 28,807 | 5/1976 | Panzer et al. ............. 260/2 BP |
| 2,595,935 | 5/1952 | Daniel et al. ............. 92/3 |
| 2,926,116 | 2/1960 | Keim ............. 524/608 |
| 2,926,154 | 2/1960 | Keim ............. 524/608 |
| 3,058,873 | 10/1962 | Keim et al. ............. 162/164 |
| 3,186,900 | 6/1965 | deYoung ............. 162/164 |
| 3,320,215 | 5/1967 | Conte et al. ............. 260/78 |
| 3,332,901 | 7/1967 | Keim ............. 26/292 |
| 3,352,833 | 11/1967 | Earle ............. 260/78 |
| 3,442,754 | 5/1969 | Espy ............. 162/164 |
| 3,819,541 | 6/1974 | Longoria et al. ............. 260/2 |
| 3,891,589 | 6/1975 | Ray-Chaudhuri ............. 260/292 |
| 3,941,736 | 3/1976 | Aldrich ............. 260/296 NR |
| 3,951,921 | 4/1976 | Espy et al. ............. 260/78 SC |
| 4,075,177 | 2/1978 | Bonnet et al. ............. 260/75 T |
| 4,129,528 | 12/1978 | Petrovich et al. ............. 260/823 |
| 4,184,019 | 1/1980 | Meteyer et al. ............. 521/34 |
| 4,287,110 | 9/1981 | Takagishi et al. ............. 260/292 |
| 4,336,835 | 6/1982 | Takagishi et al. ............. 162/164 |
| 4,714,736 | 12/1987 | Juhl et al. ............. 524/608 |
| 4,975,499 | 12/1990 | Bachem et al. ............. 524/608 |
| 5,017,642 | 5/1991 | Hasegawa et al. ............. 524/608 |
| 5,019,606 | 5/1991 | Marten et al. ............. 523/414 |
| 5,171,795 | 12/1992 | Miller et al. ............. 525/430 |
| 5,189,142 | 2/1993 | Devore et al. ............. 528/339.3 |
| 5,239,047 | 8/1993 | Devore et al. ............. 528/339.3 |

FOREIGN PATENT DOCUMENTS

| 0335157 | 4/1989 | European Pat. Off. |
| 0512423 | 4/1992 | European Pat. Off. |
| 2833654 | 2/1980 | Germany. |
| 865727 | 4/1961 | United Kingdom. |

*Primary Examiner*—Samuel A. Acquah
*Attorney, Agent, or Firm*—Ivan G. Szanto

[57] ABSTRACT

Disclosed is a two-step process for making an epichlorohydrin resin involving reacting the epichlorohydrin with a polyamine in a mixture first at a temperature of 25°–40° C. and then heating the mixture at 25°–85° C.

70 Claims, No Drawings

PROCESS FOR MAKING EPICHLOROHYDRIN RESINS

This application is a continuation of application Ser. No. 07/939,858, filed Sep. 2, 1992 now abandoned, which application is a continuation of application Ser. No. 07/819,560 filed Jan. 13, 1992 now abandoned, which application is a continuation-in-part of application Ser. No. 07/619,835, filed Nov. 30, 1990 now abandoned.

The present invention relates to a process for making water soluble epichlorohydrin resins. In particular it relates to a process for making epichlorohydrin resins by reacting epichlorohydrin with a polyamine.

Epichlorohydrin (epi) is a useful material in the manufacture of a wide range of chemicals and polymers in aqueous media. Synthetic water-soluble epichlorohydrin resins, such as polyaminoamide-epichlorohydrin wet-strength resins, are used for, for example, in manufacturing paper. Procedures for making polyaminoamide-epichlorohydrin resins are well known. In order to maximize useful functionality in the final product, these processes involved reacting aqueous polyamine with an excess of epichlorohydrin in order to cause complete conversion of amine to epichlorohydrin adducts.

Such manufacturing processes result in the formation of undesirable byproducts such as 1,3-dichloro-2-propanol (DCP) and 1-chloro-2,3-propanediol (CPD). Accordingly, it would be advantageous to have a process effecting reduced levels of unwanted byproducts such as 1,3-dichloro-2-propanol and 1-chloro-2,3-propanediol while still resulting in desired products having acceptable functionality levels.

U.S. Pat. No. 5,017,642, corresponding to EPA 0 374 938, discloses a process for producing an aqueous solution of a cationic thermosetting resin containing a very small amount of organic halogen compounds, which comprises the steps of:

(i) heating an aliphatic dicarboxylic acid and a polyalkylenepolyamine in a molar ratio of the aliphatic-dicarboxylic acid to the polyalkylenepolyamine of 1:1.0 to 1:1.2 until the viscosity at 25° C. of a 50% aqueous solution of the resulting polyamidopolyamine reaches 400 to 1000 cps to obtain a polyamidopolyamine;

(ii) reacting the polyamidopolyamine with epihalohydrin in an aqueous medium at a temperature from 10° to 55° C. under such conditions that the amount of epihalohydrin is from 0.85 to 1.40 moles per mole of secondary amino group present in the polyamidopolyamine when the reaction temperature is from 10° to 45° C. or from 0.85 to 1.25 moles per mole of said secondary amino group when the reaction temperature is from 45° to 55° C. the total concentration of said reactants in the aqueous medium being 20 to 70% by weight until the total amount of unreacted epichlorohydrin and other organic halogen compound does not change substantially;

(iii) maintaining or lowering the concentration of the resulting aqueous solution of the reaction product;

(iv) keeping the temperature of the aqueous solution from 25° to 70° C. until the viscosity at 25° C. of the aqueous solution at a concentration of 15% reaches 10 to 100 cps; and (v) adjusting Ph of the resulting aqueous solution of the product to 3 to 5 at 25° C.

European Patent Application No. 91307024.9 discloses a method for synthesizing water soluble polyaminopolyamide-epichlorohydrin resins comprising: (a) reacting an aqueous solution of a polyaminopolyamide resin having a concentration of about 13.5% to 70% with from about 0.05 to 1.5 molar equivalents of epichlorohydrin based on the secondary amine nitrogen content of the polyaminopolyamide resin at a temperature not exceeding 60° C. until about 70% to 100% of the total charge of epichlorohydrin has reacted; (b) adding from about 0.1% to 30% of one molar equivalent first divided by the number of acidic hydrogen atoms per molecule of a halogen-free mineral acid based on the original secondary amine nitrogen content of the polyaminopolyamide resin at a temperature of from about 20° C. to 100° C.; and (c) continuing the reaction at a temperature of about 20° C. to 100° C. to effect at least a 10% reduction in the polymer bound organochlorine concentration, based on the composition of the reaction mixture at the time of the acid addition.

Accordingly, the present invention provides an improvement in a process for producing a cationic, water-soluble polyaminoamide epichlorohydrin resin comprising reacting epichlorohydrin with a polyaminoamide solution, the improvement comprising (a) reacting a $C_3$ to $C_{12}$ dicarboxylic acid or dicarboxylic acid derivative with a polyalkylene polyamine containing at least one secondary amine group in a mole ratio of dibasic acid to polyalkylene polyamine of from about 1.025 to about 1.1 to obtain a polyaminoamide, (b) reacting the epichlorohydrin with the polyaminoamide in a mixture first at a temperature of 25°–40° C. and then (c) heating the mixture at 25°–85° C. According to the present invention (i) a solution comprising by weight 30–100% polyaminoamide and 0–70% water is reacted with (ii) epichlorohydrin at a molar ratio of epichlorohydrin to amine groups in the polyaminoamide of 0.8–0.95. The present invention further provides an intermediate polyaminochlorohydrin having at least 60% aminochlorohydrin functionality and a water-soluble epichlorohydrin resin at a Ph of 2.5–3.5.

In the polyaminochlorohydrin intermediate, the molar ratio of aminochlorohydrin groups to amine groups in the initial polyaminoamide should be more than the molar ratio of epichlorohydrin to amine groups in the initial polyaminoamide minus 0.05 and preferably, it should be more than such molar epi:amine ratio minus 0.01.

In a preferred process of the present invention, a polyamine having secondary amine functionality of the formula

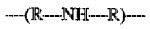

wherein R and R is the polymeric backbone is reacted with epichlorohydrin

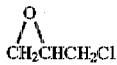

to form an intermediate polyaminochlorohydrin

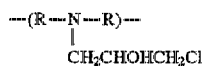

wherein R and R are as defined hereinabove. The temperature at which the reaction is conducted is maintained at 25°–40° C., preferably 25°–35° C., more preferably initially at 30° C., then after the addition of epichlorohydrin slowly raised to 35° C. for the remainder of the reaction. Exemplary preferred polyamines are polyaminoamides disclosed in U.S. Pat. Nos. 2,926,116 and 2,926,154 the disclosures of which are incorporated herein by reference. Such preferred materials are made by condensing a dicarboxylic acid derivative with a polyalkylenepolyamine. The acid residues can be aliphatic, aromatic, or aralkyl, and can contain between 3 and 12 carbon atoms. The aliphatic acid residues can be linear or cyclic. Preferred acid residues are adipoyl and glutaroyl. The polyalkylenepolyamine residues generally contain at least one secondary amino group and can be tri-, tetra-, penta-, or higher amines, and can also contain another amine or other functionality. The amino groups in the polyalkylenepolyamine can be connected by aliphatic residues such as ethylene or trimethylene groups, or aromatic residues such as phenylene, aralkyl residues such as xylyl.

The temperatures employed for carrying out the reaction between the dibasic acid and the polyalkylene polyamine may vary from about 110° C. to about 250° C. or higher at atmospheric pressure. For most purposes, however, temperatures between about 160° C. and 210° C. have been found satisfactory and are preferred. Where reduced pressures are employed, somewhat lower temperatures may be utilized. The time of reaction depends on the temperatures and pressures utilized and will ordinarily vary from about ½ to 2 hours, although shorter or longer reaction times may be utilized depending on reaction conditions. In any event, the reaction is desirably continued to substantial completion for best results.

In carrying out the reaction, it is preferred to use an amount of dibasic acid sufficient to react substantially completely with the primary amine groups of the polyalkylene polyamine but insufficient to react with the secondary amine groups to any substantial extent. The mole residue of dibasic acid residue precursor to polyamine residue is preferably 1.025–1.1.

The reaction temperatures of 25–40° C. are used to help prevent the reaction of chloride ion with epichlorohydrin to form 1,3-dichloro-2-propanol and the reaction of epichlorohydrin with water to form 1-chloro-2,3-propanediol.

In order to prevent the formation of azetidinium chloride and to prevent the reaction of chloride ion with epi to form DCP, the temperature of the reaction mixture should be as low as possible. However, low temperatures such as below 25° C. tend to cause problems of inconveniently long reaction times, high viscosity, poor mixing and heat removal. We have discovered that 25°–40° C. and 25–35° C. is most advantageous.

Preferably, the reaction is carried out such that the molar ratio of epichlorohydrin to the amine groups in the polyamine is 0.5–1, more preferably 0.8–0.95. By using an equimolar ratio or less there is little or no epichlorohydrin remaining after the reaction is complete to form unwanted byproducts.

Also advantageously, the polyaminoamide is reacted with epichlorohydrin in a solution of by weight 0–70% of water and 30–100% of polyaminoamide, preferably 30–60% of water and 40–70% of polyaminoamide.

At an epi/amine mole ratio range of 0.50–1.00, the range of 30–100% of polyaminoamide corresponds to about 34–100% of reaction solids, and the range of 40–70% of polyaminoamide corresponds to about 44–75% of reaction solids.

At an epi/amine mole ratio range of 0.80–0.95 the range of 30–100% of polyaminoamide corresponds to reaction solids range of about 37–100%, and the range of 40–70% of polyaminoamide corresponds to about 47–77% of reaction solids.

Reaction solids are calculated as follows:

$$\text{Reaction Solids} = \frac{1+c}{c+100/\% \text{ PAAS}}$$

where $c = \frac{92.53}{213.28} \times (epi/\text{amine ratio})$ and

PAAS is the polyaminoamide solids

By controlling the amount of water between these limits it has been discovered that the formation of 1-chloro-2,3-propanediol by the reaction of epichlorohydrin with water is even further limited. Reaction time varies depending on the temperature, with lower temperatures taking longer times. In order to facilitate the reaction of the epi with amine, and in order to discourage the reaction of epi with water to form DCP, the concentration of epi and amine in the reaction mixture should be as high as possible. However, the mixing and heat removal capabilities of available equipment may impose limitations on reactant concentrations. Generally, reaction times vary between about 1 and 19 hours, preferably between 3 and 6 hours. Because the reaction is exothermic, the epichlorohydrin is added slowly over time to the polyaminoamide to allow for more effective heat transfer from the reaction medium. Heat transfer from the reaction medium can be accomplished according to known procedures, such as immersing the reaction vessel in a refrigerated environment, e.g., an ice bath, or passing refrigerated coils inside the reaction vessel. Preferably, reaction conditions are adjusted so that, based on a final polyaminoamide-epichlorohydrin product having a total solids content of 12.5 weight %, the amount of 1,3-dichloro-2-propanol in the product is less than 2000 ppm, more preferably less than 1000 ppm, and the amount of 1-chloro-2,3-propanediol in the product is less than 600 ppm, more preferably less than 300 ppm.

At the ratios and solids content described hereinabove, the polyaminochlorohydrin intermediate has an aminochlorohydrin functionality of at least 60%. Preferably, at least 70% of the number of secondary amine groups of the polyaminoamide are converted to aminochlorohydrin groups. More preferably, the aminochlorohydrin functionality is about 80–95%. It will be recognized that the number of amine groups converted is limited by the ratio of epichlorohydrin to amine groups. For example, for a ratio of 0.8, the maximum possible conversion of secondary amine groups is 80%. The temperatures of 25°–40° C. used also result in relatively little isomerization of the aminochlorohydrin groups formed to 3-hydroxyazetidinium groups. Preferably, the 3-hydroxyazetidinium functionality, i.e., the number of amine groups in the polyaminoamide converted to 3-hydroxyazetidinium groups, in the polyaminochlorohydrin intermediate is less than 20%, more preferably less than 10%, most preferably 2–5%.

In a further preferred embodiment, after the epichlorohydrin is reacted, in a second stage the reaction mixture is heated to a temperature of 25°–85° C., preferably 45°–65° C. Heating times vary depending on the temperature used, with higher temperatures resulting in shorter times. Generally, the heating time varies between 1 hour and 7 days. Lower heating temperatures result in lower amounts of 1,3-dichloro-2-propanol and 1-chloro-2,3-propanediol in the final product. The second stage causes isomerization of some of the aminochlorohydrin groups on the polyaminochlorohydrin to 3-hydroxyazetidinium chloride groups and cross-links other aminochlorohydrin groups to form the final polyaminoamide-epichlorohydrin resin. Resin formation is detectable by increases in viscosity and the reaction proceeds until the desired viscosity level is achieved, but before the material cures to a water-insoluble material. The desired viscosity level is chosen so as to result in a final product having a Brookfield viscosity of 40–60 centipoise based on a total solids content of 12.5 weight %. Generally, the desired viscosity at which heating is discontinued (i.e., the second stage of the reaction halted) is at least C or higher on the Gardner-Holdt scale, depending upon the solids concentration of the reaction mixture, with higher solids concentrations resulting in higher values on the Gardner-Holdt scale. Preferably, the second stage is halted at a Gardner-Holdt viscosity of J when the solids content of the reaction mixture is about 20 weight %, at a Gardner-Holdt viscosity of M when the solids content is about 25 weight %, and at a Gardner-Holdt viscosity of T when the solids content is 30 weight %.

When the desired viscosity is reached, water is preferably added to adjust the solids content to the desired level, and then stabilized by adding sufficient acid to reduce the pH to about 2.5–3.5. Suitable acids include hydrochloric acid, sulfuric acid, nitric acid, formic acid, phosphoric acid, and acetic acid. At a pH greater than about 3.5 the material begins to cure to a water-insoluble rubber, while at a pH less than about 2.5 the material begins to decompose.

The polyaminoamide-epichlorohydrin resins of the present invention are useful as wet strength agents for paper materials, such as paper towels, absorbent tissue, wrapping paper, and bag paper. Preformed or partially dried paper can be impregnated by immersion in the resin or by spraying the resin on the paper, following which the paper can be heated for about 0.5–30 minutes at temperatures of about 90° C. or higher to fully cure the thermosetting resin to a water-insoluble material.

The resin is incorporated in paper at preferred amounts of about 0.1–5% by dry weight of the paper. Quantities of resin added to aqueous paper stock will depend on the degree of wet strength desired in the finished product and on the amount of resin retained by the paper fibers.

To more clearly describe the present invention, the following non-limiting examples are provided. In the examples parts and percentages are by weight unless indicated otherwise.

EXAMPLE 1

A polyaminoamide is prepared according to the following procedure. About 1068 parts diethylenetriamine and 514 parts water are heated in a kettle equipped with an agitator. The agitator is started and about 1550 parts of adipic acid are added at a rate of about 100 parts per minute (mole ratio of acid to amine is 1.025). After the acid is added, the temperature of the mixture is raised to about 190–195° C., and maintained at that temperature for about 90 minutes. The mixture is then cooled to about 170° C., and about 2400 parts of water are slowly added. The product is cooled to about 25° C. and has a polyaminoamide solids content of about 53.7%.

In the first stage of the process, a 50% solids homogeneous solution of the polyaminoamide (0.528 moles) is stirred at 120 rpm in a reaction kettle immersed in a thermostat bath maintained at 30° C. ($T^1$). Epichlorohydrin (99%, 0.528 moles, available from Aldrich Chemical Company) is added over a two-hour period, and the reaction stirred for an additional 4 hours at 30° C. ($P^1$=5 hours). In the second stage of the process, the resulting 59% solids solution of polyaminochlorohydrin intermediate is transferred to a round-bottom flask, diluted to 30% solids with water, stirred at about 380 rpm, and heated at about 65° C. ($T^2$). Over a two-hour period as the Gardner-Holdt viscosity of 25° C. aliquots advanced to T, the temperature of the reaction mixture is decreased to about 50° C. Heating is discontinued at the Gardner-Holdt viscosity of T and the mixture allowed to cool.

Sulfuric acid (98%) is added along with potassium sorbate fungicide and water to obtain a pH of 3.0 at a solids content (by oven evaporation) of 13.4% and a Brookfield viscosity (V.) of 43.2 centipoise (cP).

EXAMPLE 2

Polyaminoamide and polyaminochlorohydrins are made following the procedure of Example 1 except as modified as shown in the following Table 1. The final resin product is prepared following the procedures for stage 2 of Example 1, and the solids content, 1,3-dichloro-2-propanol (DCP) content, and Brookfield viscosity determined and also reported in Table 1. In stage 2, $T^2$ is discontinued when a suitable Gardner-Holdt viscosity is reached in order to obtain in the final product a Brookfield viscosity of about 50 cP, based on a 12.5 weight % solids content in the final product.

TABLE 1

| Example | PAA | epi/PAA | $T^1$ | $P^1$ | $T^2$ | DCP (ppm) | V. (cP) |
|---|---|---|---|---|---|---|---|
| 2 | 50% | 0.7 | 25° C. | 6 hr | 60° C. | 27 | 53.8 |
| 3 | 50% | 0.8 | 25° C. | 3 hr | 70° C. | 131 | 51.1 |
| 4 | 50% | 0.8 | 25° C. | 6 hr | 60° C. | 123 | 8.8 |
| 5 | 50% | 0.8 | 25° C. | 7 hr | 60° C. | 200 | 19.1 |
| 6 | 50% | 0.9 | 25° C. | 3 hr | 65° C. | 950 | 47.6 |
| 7 | 50% | 0.9 | 25° C. | 6 hr | 60° C. | 640 | 41.6 |
| 8 | 50% | 0.9 | 30° C. | 3 hr | 65° C. | 767 | 60.6 |
| 9 | 50% | 0.9 | 25° C. | 6 hr | 65° C. | 833 | 52.4 |
| 10 | 50% | 1.0 | 25° C. | 3 hr | 70° C. | 2622 | 44.5 |
| 11 | 50% | 1.0 | 30° C. | 3 hr | 65° C. | 2673 | 49.2 |
| 12 | 60% | 0.8 | 25° C. | 7 hr | 60° C. | 200 | 9.5 |
| 13 | 60% | 0.8 | 30° C. | 7 hr | 70° C. | 81 | 48.4 |
| 14 | 70% | 0.8 | 25° C. | 7 hr | 70° C. | 600 | 295.0 |
| 15 | 70% | 0.8 | 30° C. | 7 hr | 60° C. | 270 | 269.5 |
| 16 | 50% | 0.9 | 35° C. | 3 hr | 25° C. | 844 | 32.9 |

Some of the resins are tested for wet-strength characteristics in paper. To three 70:30 mixtures of Weyerhauser bleached hardwood kraft and Rayonier bleached kraft pulps maintained at a water hardness of 100 ppm, a 50 ppm alkalinity, and a pH of 7.6, amounts of 0.25%, 0.5%, and 1% of the resin based on pulp are added. For comparison, paper was also prepared having no wet-strength additive.

Paper made has the basis weight of 40 lbs/ream. A press having 45 lbs/linear inch or pressure is used in the papermaking. The paper is dried to four percent moisture on seven driers at 150°–190° F. Oven curing is carried out at 80° C. for 0.5 hr. Wet tensile tests are performed on six-inch span, 0.5 inch strips at the rate of two inches per minute. Wet tensile strengths (WT) measured are nominalized to the basis weight of 40 lbs/ream. Results from papers treated at dosage (D) of the levels 0.25%, 0.5%, and 1.0% as described hereinabove are least-squares fitted by adjusting constants in the equation $$1/WT = a/D + b$$

and the results are interpolated to 0.5% rs. pulp. The values obtained are reported in the following Table 2.

TABLE 2

| Example | Wet Tensile Strength (lbs/in) |
| --- | --- |
| 3 | 3.96 |
| 4 | 4.74 |
| 5 | 3.96 |
| 6 | 6.11 |
| 7 | 5.78 |
| 8 | 6.23 |
| 9 | 6.02 |
| 10 | 6.08 |
| 11 | 6.01 |
| 12 | 3.76 |
| Comparative example | 0.67 |

I claim:

1. In a process for producing a water-soluble epichlorohydrin wet strength resin comprising reacting epichlorohydrin with a polyaminoamide solution, the improvement, consisting essentially of (1) reacting a $C_3$ to $C_{12}$ dicarboxylic acid or dicarboxylic acid derivative with a polyalkylene polyamine containing at least one secondary amine group in a mole ratio of dibasic acid to polyalkylene polyamine of from about 1.025 to about 1.1 to obtain a polyaminoamide; and (2)(a) reacting the epichlorohydrin with the polyaminoamide in a mixture first at a temperature of from about 25° to about 40° C. and then (b) heating the mixture at a temperature of from about 45° to about 85° C., wherein the molar ratio of epichlorohydrin to amine groups in the polyaminoamide is from about 0.5 to 1 and the solution comprises by weight from about 30 to about 100% of polyaminoamide and from 0 to 70% of water, thereby resulting in a polyaminoamide-epichlorohydrin resin having a 1,3-dichloro-2-propanol content of less than about 2000 ppm.

2. The process of claim 1 wherein the solution comprises by weight from about 30 to about 70% of polyaminoamide and from about 30 to about 70% of water and step (a) is performed at a temperature of from about 25° to about 35° C.

3. The process of claim 1 wherein the ratio of epichlorohydrin to amine groups is at least about 0.8 and the solution comprises by weight at least about 50% of polyaminoamide and up to about 50% of water.

4. The process of claim 3 wherein step (a) is performed at a temperature of at least about 30° C.

5. The product made by the process of claim 1.

6. The product made by the process of claim 2.

7. The product made by the process of claim 3.

8. The product made by the process of claim 4.

9. A process for making a polyaminochlorohydrin consisting essentially of (a) reacting a $C_3$ to $C_2$ dicarboxylic acid or dicarboxylic acid derivative with a polyalkylene polyamine containing at least one secondary amine group in a mole ratio of dibasic acid to polyalkylene polyamine of from about 1.025 to about 1.1 to obtain a polyaminoamide; and (b) reacting at a temperature of 25°–40° C. (i) a solution comprising by weight 30–100% of said polyaminoamide and 0–70% of water with (ii) epichlorohydrin at a molar ratio of epichlorohydrin to amine groups in the polyaminoamide of 0.5–1.0, thereby resulting in a polyaminochlorohydrin having a 1,3-dichloro-2-propanol content of less than about 2000 ppm.

10. The process of claim 9 wherein step (a) is performed at a temperature of 25°–35° C.

11. The process of claim 10 wherein in the polyaminochlorohydrin the molar ratio of aminochlorohydrin groups to amine groups in the polyaminoamide is more than the molar ratio of epichlorohydrin to amine groups in the polyaminoamide minus 0.05.

12. The process of claim 9 wherein the ratio of epichlorohydrin to amine groups is at least about 0.8, the solution comprises by weight at least about 50% of polyaminoamide and up to about 50% of water.

13. The process of claim 12 wherein in the polyaminochlorohydrin the molar ratio of aminochlorohydrin groups to amine groups in the polyaminoamide is more than the molar ratio of epichlorohydrin to amine groups in the polyaminoamide minus 0.01.

14. The process of claim 12 wherein step (b) is performed at a temperature of at least about 30° C.

15. The process of claim 9 further comprising heating the polyaminochlorohydrin at a temperature of at least about 45° C. to convert aminochlorohydrin groups in the polyaminochlorohydrin to 3-hydroxyazetidinium groups.

16. In a process for producing a water-soluble epichlorohydrin wet strength resin comprising reacting epichlorohydrin with a polyaminoamide solution, the improvement consisting essentially of (a) reacting a $C_3$ to $C_{12}$ dicarboxylic acid or dicarboxylic acid derivative with a polyalkylene polyamine containing at least one secondary amine group in a mole ratio of dibasic acid to polyalkylene polyamine of from about 1.025 to about 1.1 to obtain a polyaminoamide, (b) reacting the epichlorohydrin with the polyaminoamide in a mixture first at a temperature of 25°–40° C. to obtain a polyaminochlorohydrin intermediate and then (c) heating the mixture at 45°–85° C. wherein the molar ratio of epichlorohydrin to amine groups in the polyaminoamide is 0.5–1 and the solution comprises by weight from about 30 to about 100% of polyaminoamide and from 0 to about 70% of water, thereby resulting in a polyaminoamide-epichlorohydrin resin having a 1,3-dicloro-2-propanol content of less than about 2000 ppm.

17. The process of claim 16 wherein the solution comprises by weight from about 30 to about 70% of polyamminoamide and from about 30 to about 70% of water, and step (b) is performed at a temperature of from about 25° to about 35° C.

18. The process of claim 17 wherein in the polyaminochlorohydrin the molar ratio of aminochlorohydrin groups to amine groups in the polyaminoamide is more than the molar ratio of epichlorohydrin to amine groups in the polyaminoamide minus 0.05.

19. The process of claim 16 wherein the ratio of epichlorohydrin to amine groups is 0.8–0.95, the solution comprises by weight 50–80% of polyaminoamide and 20–50% of water.

20. The process of claim 19 wherein in the polyaminochlorohydrin the molar ratio of aminochlorohydrin groups to amine groups in the polyaminoamide is more than the molar ratio of epichlorohydrin to amine groups in the polyaminoamide minus 0.01.

21. The process of claim 19 wherein step (b) is performed at a temperature of from about 30° to about 35° C.

22. The process of claim 16 wherein step (c) is performed at a temperature of 45°–65° C.

23. The wet strength resin made by the process of claim 16.

24. The wet strength resin made by the process of claim 17.

25. The wet strength resin made by the process of claim 18.

26. The wet strength resin made by the process of claim 19.

27. The wet strength resin made by the process of claim 20.

28. The wet strength resin made by the process of claim 21.

29. The wet strength resin made by the process of claim 22.

30. An aqueous solution comprising a cationic water-soluble epichlorohydrin resin at a pH of 2.5–3.5.

31. The solution of claim 30 wherein the resin is polyaminoamide-epichlorohydrin resin.

32. A composition comprising polyaminochlorohydrin having at least 60% aminochlorohydrin functionality and a 1,3-dichloro-2-propanol content of less than about 2000 ppm.

33. The composition of claim 32 wherein the polyaminochlorohydrin has at least 80% aminochlorohydrin functionality.

34. The process of claim 1 wherein the solution comprises by weight at least about 40% of polyaminoamide and up to about 60% of water.

35. The process of claim 1 wherein the ratio of epichlorohydrin to amine groups is up to about 0.95 and the solution comprises by weight up to about 80% of polyaminoamide and up to about 50% of water.

36. The process of claim 3 where step (a) is performed at a temperature of up to about 35° C.

37. The wet strength resin made by the process of claim 34.

38. The wet strength resin made by the process of claim 35.

39. The wet strength resin made by the process of claim 36.

40. The process of claim 9 wherein the ratio of epichlorohydrin to amine groups is up to about 0.95, the solution comprises by weight up to about 80% of polyaminoamide and up to about 50% of water.

41. The process of claim 40 wherein in the polyaminochlorohydrin the molar ratio of aminochlorohydrin groups to amine groups in the polyaminoamide is more than the molar ratio of epichlorohydrin to amine groups in the polyaminoamide minus 0.01.

42. The process of claim 12 wherein step (b) is performed at a temperature of up to about 35° C.

43. The process of claim 40 wherein step (b) is performed at a temperature of at least about 30°.

44. The process of claim 40 wherein step (b) is performed at a temperature of up to about 35° C.

45. The process of claim 2 wherein the solution comprises by weight at least about 40% of polyaminoamide and up to about 60% of water.

46. The wet strength resin made by the process of claim 45.

47. The process of claim 9 further comprising heating the polyaminochlorohydrin at a temperature of up to about 65° C. to convert aminochlorohydrin groups in the polyaminochlorohydrin to 3-hydroxyazetidinium groups.

48. The product made by the process of claim 9.
49. The product made by the process of claim 10.
50. The product made by the process of claim 11.
51. The product made by the process of claim 12.
52. The product made by the process of claim 13.
53. The product made by the process of claim 14.
54. The product made by the process of claim 15.
55. The product made by the process of claim 40.
56. The product made by the process of claim 41.
57. The product made by the process of claim 42.
58. The product made by the process of claim 43.
59. The product made by the process of claim 44.
60. The product made by the process of claim 45.
61. The product made by the process of claim 46.
62. The product made by the process of claim 47.

63. The process of claim 17 wherein the solution comprises by weight at least 40% of polyaminoamide and up to about 60% of water.

64. The product made by the process of claim 63.

65. The process of claim 1 wherein the 1,3-dichloro-2-propanol content of the polyaminoamide-epichlorohydrin resin is less than about 1000 ppm.

66. The process of claim 2 wherein the ratio of epichlorohydrin to amine groups is at least about 0.8 and the solution comprises by weight at least about 50% of polyaminoamide and up to about 50% of water and the 1,3-dichloro-2-propanol content of the polyaminoamide-epichlorohydrin resin is lees than about 1000 ppm.

67. The product made by the process of claim 65.
68. The product made by the process of claim 66.

69. The process of claim 16 wherein the 1,3-dichloro-2-propanol content of the polyaminoamide-epichlorohydrin resin is less than about 1000 ppm.

70. The product made by the process of claim 69.

* * * * *